United States Patent [19]

Bone et al.

[11] Patent Number: 4,588,596

[45] Date of Patent: May 13, 1986

[54] READY-TO-EAT CEREALS

[75] Inventors: David P. Bone, Palatine; Kathryn M. Brophy, Cary; Robert M. Champion, Barrington; Robert J. Meschewski, East Dundee; Craig W. McKinney, Schaumburg, all of Ill.

[73] Assignee: The Quaker Oats Company, Chicago, Ill.

[21] Appl. No.: 544,031

[22] Filed: Oct. 24, 1983

[51] Int. Cl.$^4$ .................. A21D 2/02; A23L 1/164
[52] U.S. Cl. .................................. 426/290; 426/322; 426/620; 426/653
[58] Field of Search .................. 426/94, 96, 289, 290, 426/305, 310, 629, 21, 653, 549, 322

[56] References Cited

U.S. PATENT DOCUMENTS 3,769,438 10/1973 Rusch et al. .................. 426/620
3,860,733 1/1975 Morse et al. .................. 426/96
4,013,802 3/1977 Reesman .................. 426/621

Primary Examiner—Steven Weinstein
Assistant Examiner—Elizabeth A. King
Attorney, Agent, or Firm—Joseph P. O'Halloran

[57] ABSTRACT

A new class of ready-to-eat cereals is disclosed. These products are baked bite sized pieces produced from a cookie dough, but having a bowl life of at least 3 minutes, and preferably containing fat in the amount between 3 and 17 percent, in which an effective bowl-life extending amount of an additive selected from the group free fatty acid, edible insoluble metallic salt of fatty acid, and mixtures thereof, is added.

A preferred additive for providing bowl life in emminently satisfactory ranges is magnesium stearate.

22 Claims, No Drawings

READY-TO-EAT CEREALS

BACKGROUND

For maximum consumer acceptance, ready-to-eat cereals should have a crisp texture and yet be tender and have a light friable structure. By "ready-to-eat-cereals" we mean bite sized edible products which contain substantial levels of flour or other cereal-grain derived ingredients and which maintain their structural integrity for a reasonable time in milk. Such cereals are typically served in a bowl with milk, and to be generally acceptable, after the milk is added their crisp texture should persist until the entire bowl full is consumed. Examples of such ready-to-eat cereals are crisp corn flakes, Crispy Wheats and Raisins(TM), Captain Crunch(TM), Crunch Berries(TM), Rice Krispies(TM), and Crispix(TM). In many instances the acceptable bowl life of a breakfast cereal product is achieved largely by providing a heavy sugar coating. In other instances the manufacturer may produce a less tender, less friable product in order to obtain an acceptable quality of bowl life. In some cases, such as in the case of puffed wheat and puffed rice, bowl life has been found to be very short compared with other ready-to-eat cereals. Also, cereals made with conventional extrusion-expansion methods tend to have relatively short bowl life, as well, unless coated, or otherwise treated.

Another class of foods which might be potentially attractive as ready-to-eat cereals are cereal-grain containing products such as cookies and other products which are analogous to baked goods. Such products could be manufactured in bite size pieces such as for example, bite size oatmeal cookie pieces. Such highly nutritious ready-to-eat cereal-derived foods have not been developed commercially as ready-to-eat cereals, in spite of their tasty and highly nutritious wholesome character, because such products have heretofore suffered from very short bowl life and quickly disintegrate when immersed in milk. It is well known, for example, that oatmeal cookies that are dunked in milk tend to become soggy quickly, and in fact tend to disintegrate very quickly. Interestingly enough, we have discovered that higher shortening levels in the cookie formulations, typically correlate with lower "bowl life" i.e. shorter "dunk" disintegration times. We have not yet rigorously established the scientific basis for this phenomenon though one could speculate on several possible explanations. It is consistent with the "tenderization" effect associated with the addition of shortenings, for example.

It is the purpose of the invention to provide a method for improving the bowl life of ready-to-eat cereals, and specifically to provide a new class of tasty, nutritious, wholesome ready-to-eat cereals which exhibit substantially improved bowl life, even without the application of a sugar coating. Preferred products may utilize substantially reduced sugar coatings, or no sugar coatings at all.

It is another object of the present invention to provide expanded ready-to-eat cereals, whether oven baked, or cooked by other means, having improved bowl life.

It is a further object of the present invention to provide a ready-to-eat cereal comprising bite size pieces having a composition similar to cookies, such as for example to oatmeal cookies and other cookie-like compositions containing normal levels of fat, and yet which have emminently satifactory bowl life when served in the style of ready-to-eat cereals.

SUMMARY OF THE INVENTION

These and other objects which will be apparent hereinafter, are all achieved in accordance with the present invention in which a member selected from the group fatty acid and insoluble, edible, metallic fatty acid salts, or mixtures thereof, is added to the ready-to-eat cereal or to its ingredients in an amount which is effective to provide enhanced bowl life characteristics. In one aspect of this invention, the fatty acid or the insoluble, edible, metallic fatty acid salt, which is used in accordance with the present invention, can be applied to the surface of the cereal piece as a solid powder and heated to melt the solid and integrate the material with the ready-to-eat cereal at the surface thereof. In a more preferred embodiment, the free fatty acid or insoluble, edible, metallic fatty acid salt or mixtures thereof is incorporated in an effective amount, as an ingredient into the dough, or into the dough ingredients, during the manufacture of the ready-to-eat cereal.

Generally speaking the cereal flour derived formula to which the bowl life additive is added in accordance with this invention is of the cookie type formulation. This formulation of ingredients is converted into a dough or batter, preferably into a dough which is at least stiff to dry and crumbly in character, in addition of minimal water thereto, and thereafter is shaped and baked to a moisture level of less than 10%, preferably to less than 7% and more preferably to less than 4%. The dry ingredients are altered by the addition of the water to a condition in which at least some bite-sized shapes can be formed therefrom. Reference to a "dry crumbly" dough does not mean the dough isn't shapable, e.g. by extrusion or by a press-cutter. Enough water is added to provide a dough which is shapeable and cohesive enough to maintain its configuration after shaping at least long enough for the baking to take place. Addition of large amounts of water, i.e. enough to produce a more fluid or sticky dough, produces product which is entirely satisfactory. Because of the stickiness, we prefer not to use such a dough in the shaping steps, even though it is useful in accordance with this invention.

The method for forming the cookie dough into bite-sized pieces can be any of the many methods known in the art. For example, sheeting and cutting, or extrusion and cutting, are emminently satisfactory for such shaping.

Cookie formulations typically contain at least about 35% of flour, or cereal-grain derived ingredients, from 3 to about 27% fat, and up to about 50% sugar all based on the weight of dry ingredients. Generally speaking all such formulations are useful in accordance with this invention. However, preferred formulations are those in which the flour and other cereal-grain derived ingredients are present in an amount of at least 40%, fat is present in an amount of from 3 to 17% inclusive more preferably in an amount in the range of 5 to 14% inclusive, and sugar is present in an amount from 20% to 50% inclusive. The amount of sugar can be reduced substantially if a sweetner other than sucrose is employed. Other ingredients such as mineral and vitamin supplements, starch hydrolysates, fruits, nuts, for example, can also be included according to taste.

Generally speaking, addition of the fatty acid or fatty acid salt, in accordance with the invention, is made in an amount which provides a bowl life of at least 3 minutes, preferably greater than 4 minutes. Amounts of 0.2% to about 5% are useful and amounts between 0.4% and 1.5% are preferred.

Exemplary insoluble, edible, metallic fatty acid salts used in accordance with the present invention include magnesium, calcium, and zinc stearate, for example, and, in fact, include the metallic salts of a fatty acid having from 10 to 22 carbons, inclusive, including, but not limited to decanoic, undecanoic, bendecanoic, dodecanoic, tridecanoic, tetradecanoic, pentadecanoic, hexadecanoic, heptadecanoic, octadecanoic nonadecanoic, eicosanoic, heneicosanoic, docosanoic, and tricosanoic acids. In addition, these free fatty acids are exemplary bowl life additives in accordance with this invention. These fatty acids and the insoluble, edible, metallic fatty acid salts typically are waxy solids at room temperature and can be melted by heating to temperatures in a range in which the cereal products remain stable.

The most preferred material for use in accordance with the present invention is magnesium stearate, (the magnesium salt of octadecanoic acid) although calcium and zinc stearates can be used, in accordance with the present invention.

The magnesium salts perform better than zinc or calcium, salts, yielding longer bowl life and the least flavor alteration. Calcium and zinc stearates produce a product with comparable excellent bowl life, and calcium stearate appears to impart no flavor to the product. However, at higher levels, the zinc salts produce a definitely noticeable, and in the opinion of some, slightly undesirable flavor.

In a particularly preferred embodiment of the present invention, the insoluble, edible, metallic fatty acid salts are used in ready-to-eat-cereal dough formulations which contain at least 3% fat, and preferably contain fat in the range of 3-17%, based on the weight of the dry (non-water) ingredients i.e. excluding the weight of water added as an ingredient.

Fat or shortenings used in the formulas of products of this invention, can include butter, lard, and vegetable and/or animal fat-derived shortenings or fats. Shortenings, for example, can be derived from cottonseed, peanuts, soybean, coconut, and safflower, sesame, sunflower seeds, as well as from milk, lard, beef fat or tallow.

Some or all of the fats can be hydrogenated, and use of unsaturated and polyunsaturated fats are also customary in making cookie dough. These fats are conventionally used with emulsifiers, which comprise, for example, esters of fatty acids having 14 or more carbons, combined with an alcohol having 3 or more carbon atoms, especially those further modified to enhance the hydrophyllic character of the molecule.

Exemplary shortening types include all purpose shortenings (for example, those comprising 15–20% fully hydrogenated fat blended with liquid vegetable oil), hydrogenated shortenings, emulsifying type shortenings, (for example those containing ½ to 4% fatty acid monoglycerides), long stability shortenings (for example, those from which polyunsaturated fatty acid ester moieties have been eliminated), fluid shortenings, as well as specialty fats such as, for example, cocoa butter as well as mixtures thereof.

Generally, shortenings have very low free fatty acid content, e.g. usually below 0.1% based on the weight of the fat. Butter may contain higher levels of short chain fatty acids, for example, butyric acid.

In spite of the tenderizing effect of these fats or shortenings on the cereal-grain-derived low moisture, baked products, generally, and in spite of the fact that heretofore such products were known to disintegrate i.e. lose their structural integrity, in relatively short times, (e.g. in less than 30 seconds) in aqueous solution such as, for example, in milk, we have discovered that addition of relatively low levels of the bowl life additives of this invention result in products having bowl life in milk, for example, of 4 to 10 minutes or more.

The methods and compositions of the present invention are illustrated in accordance with the following examples in which all parts are in parts by weight, and in which percents are expressed as percent of the mixture then referred to, based on weight. All temperatures are expressed in degrees fahrenheit. The baking conditions set forth in the examples result in product moisture levels of about 2% unless otherwise specified.

EXAMPLE 1

The method and product of this example provides a ready-to-eat-cereal of a formulation analogous to that of a cookie, which ready-to-eat cereal has an emminently satisfactory bowl life for use as a ready-to-eat-cereal.

| Ingredient | parts |
| --- | --- |
| Flour | 31.98 |
| Brown Sugar | 15.54 |
| Sucrose | 17.36 |
| Whole Egg | 14.25 |
| Vanilla Flavor | .31 |
| Oat Flakes | 13.07 |
| Shortening | 4.33 |
| Baking Soda | .47 |
| Salt | .50 |
| Cinnamon | .23 |

A ready-to-eat cereal was prepared with the above formula similar to that of an oatmeal cookie. Sufficient water is added to the mixture above to produce a stiff kneadable dough i.e. about 9 parts per 100 parts of dry ingredients. The dough is sheeted, and cut or otherwise shaped into bite-sized cereal pieces, and then baked. The resulting warm cereal pieces were then dusted with zinc stearate powder. The thus coated cereal was placed in a 350° F. oven for 2 minutes then redusted and heated a second time. Because the cereal was dusted when warm the stearate adhered and coated well. During the 2 minute heating period the stearate salt melted and formed an invisible coating, and repeating the process the second time is believed to have better insured adequate coverage. Analysis of the resulting product shows a zinc level of 0.545 grams per 100 grams which indicates a zinc stearate level of 0.525%. The thus coated cereal was covered with milk and evaluated at 30 second intervals by ingestion by judges experienced in evaluating cereal texture.

The bowl life of an otherwise identical cookie dough cereal made with the same formulation and method except that the zinc stearate ingredient is omitted was 20–30 seconds. The bowl life for the stearate coated cereals in accordance with this invention and this example was in excess of 4 minutes, a time believed to be completely satisfactory for the utilization of the product as a ready-to-eat cereal.

As an illustrative alternative, the additive of this invention can be added with a sugar-containing coating, which is normally heated to a temperature of 275°-300° F. for example. This heating step also causes the additive of this invention to melt and become uniformly distributed at the surface.

EXAMPLE 2

The procedure of Example 1 was repeated except that the coating material employed was magnesium stearate powder. The resulting cereal exhibited a bowl life which was in excess of 5 minutes for the coated cereal, whereas the control containing no magnesium stearate exhibited a bowl life of less than 30 seconds. The magnesium sample had better bowl life and was judged to have a better flavor than the zinc stearate treated product of Example 1.

EXAMPLE 3

This Example illustrates the incorporation of the edible, insoluble, metallic fatty acid salt as an ingredient into the dough formula of ready-to-eat cereals, in accordance with this invention. Zinc stearate was incorporated into the following formula for an oatmeal cookie cereal:

| Ingredient | parts |
| --- | --- |
| Flour | 31.98 |
| Brown Sugar | 15.54 |
| Sucrose | 17.36 |
| Whole Egg | 14.25 |
| Shortening | 4.33 |
| Zinc Stearate | 1.96 |
| Oat Flakes | 13.07 |
| Baking Soda | .47 |
| Salt | .50 |
| Vanilla Flavor | .31 |
| Cinnamon | .23 |

The resulting dry mix was mixed at a ratio of 90.5 parts of dry ingredients to 9.5 parts of water to make a stiff kneadable dough. The dough was sheeted and cut into bite size "O" shaped pieces sized to be suitable as a ready-to-eat cereal. The pieces were baked for 6-14 7 minutes at 355° F. in a Spooner oven to a moisture level of 3%. The bowl life of the product in accordance with the present invention was in excess of 5 minutes. The control test product made in an identical process, except that the stearate was not added to the formulation, became soggy and undesirable in milk in less than 30 seconds. We discovered that the stearate functions as well in accordance with this invention when incorporated into the product as an ingredient as it does when it is dusted on the outide, with respect to providing extended bowl life.

EXAMPLE 4

This Example illustrates the effect of various ingredient levels of zinc stearate on the bowl life and texture.

Using a formula identical to that in example 3, and a method otherwise identical to that in Example 3, respective batches of ready-to-eat cereals were prepared using zinc stearate at 1.5, 1.4, 1.0, 0.9, 0.5 and 0.0% levels respectively. There was significant improvement in bowl life at all levels of the additive, compared to the control in which none of the additive was included. The sample using 0.5% stearate had a bowl life of over 4 minutes and was highly satifactory and higher levels of zinc stearate gave somewhat higher bowl life than the 0.5% product. The 0.0% stearate additive test product gave a 20 second bowl life, a very unsatisfactory product from a ready-to-eat cereal viewpoint.

EXAMPLE 5

This Example further illustrates the effectiveness of calcium and/or magnesium stearate when used in the base formula. Calcium and magnesium stearates respectively were used to replace the zinc stearate in separate respective tests using a formula identical to that used in Example 3. The process was otherwise identical to that referred in example 3. The bowl life of calcium stearate-containing product was the same as that for zinc stearate, but there was no off flavor. Magnesium stearate produced a better bowl life than either zinc or calcium, and no off flavors were detected.

EXAMPLE 6

This example illustrates our discovery that higher fat levels in the formulation correlate to lower bowl life when the cereal grain-derived product pieces are served in a bowl covered with milk.

An oatmeal cookie dough was prepared in accordance with the following formula:

| Ingredient | Parts by Weight |
| --- | --- |
| FF Wheat Flour | 31.51 |
| Brown Sugar | 15.542 |
| Sucrose | 15.62 |
| Instant Oat Flakes | 15.72 |
| Shortening | 9.57 |
| Sodium Bicarbonate | 0.91 |
| Salt | 0.51 |
| Magnesium Stearate | 0.45 |
| Vanilla | 0.3 |
| Cinnamon | 0.26 |

The above dry ingredients were admixed at the ratio of 90.26 parts of dry ingredients per 9.73 parts of water added as an ingredient, and the resulting mixture was worked to form a stiff kneadable dough. The dough was sheeted and cut into bite size "O" shaped pieces sized to be suitable for use as a ready-to-eat cereal. The pieces were than baked in a direct fire oven for 7 minutes at 325° F. to a moisture level of 3% while supported on a solid band conveyor. The resulting product which utilized 9.57% shortening and 0.45% magnesium stearate gave a bowl life of 10 minutes when served in a bowl and covered with milk. An identical product made in accordance with the formulation and procedure described immediately above but without the magnesium stearate or any other additive in accordance with the present invention gave a bowl life of less than 30 seconds.

For comparison purposes another batch of ready-to-eat cereal product was made. In this instance the shortening was increased to 11.69 parts, and the method for manufacture was otherwise identical to the immediately preceding process. The resulting product gave a bowl life of 7 minutes.

The product made from an identical formulation and procedure as set forth immediately hereinbefore for comparison purposes, but without the magnesium stearate gave a bowl life of less than 30 seconds.

Thus, the product containing approximately 9.6% fat gave a bowl life of 10 minutes whereas the product containing approximately 11.7% fat gave a bowl life of 7 minutes, each with approximately 0.45% magnesium stearate. Hence, it is seen that increased levels of shortening are correlated with shorter bowl life even with the additive of the present invention; simply increasing the shortening levels on the other hand, gave no improvement in bowl life when the additive was not used.

EXAMPLE 7

This example will illustrate the use of a free fatty acid as an ingredient in accordance with the present invention.

A ready-to-eat cereal is prepared in accordance with this invention from the following formulation:

| Ingredient | Parts by Weight |
| --- | --- |
| FF Wheat Flour | 31.51 |
| Brown Sugar | 15.45 |
| Sucrose | 17.23 |
| Instant Oat Flakes | 14.11 |
| Shortening | 9.57 |
| Sodium Bicarbonate | 0.91 |
| Salt | 0.51 |
| Stearic Acid | 0.45 |
| Vanilla | 0.3 |
| Cinnamon | 0.26 |

The above ingredients were mixed to form a dry mix, and were then mixed with water in the ratio of 90.26 parts of dry ingredients to 9.74 parts of water. The resulting admixture was mixed to form a dry, crumbly but shapable dough, and the resulting dough was sheeted and cut into bite sized pieces having a "O" shape sized to be suitable for use as a ready-to-eat cereal. The resulting product was heated for 7 minutes at 325° F. in a conventional oven supported on solid band conveyor.

The resulting product had a moisture of about 2% when "done", and evidenced a bowl life of 5 minutes, when served as a ready-to-eat cereal, covered with milk.

In a comparison, in which the identical formulation was used in an otherwise identical process except that there was no additive added in accordance with the present invention, the resulting product had a bowl life of less than 30 seconds. For additional comparison purposes, another respective batch of ready-to-eat cereal product was used, also in accordance with the present invention and the method of this example, in which magnesium stearate was used instead of the stearic acid and in the same amount in the formula set forth last above. The resulting product was observed to provide a bowl life of 10 minutes when served as a ready-to-eat cereal, covered with milk.

Thus the stearic acid, used in accordance with the present invention, dramatically increases the bowl life of the product when served as a ready-to-eat cereal, e.g. covered with milk in a bowl.

In its preferred aspects, the product and method in accordance with the present invention are utilized to best advantage in embodiments in which the "dry" ingredients contain from about 3 to 17% fat supplied as shortening. The method and composition of the present invention are useful above and below this range for fat, but the maximum advantage is believed to ensue from embodiments of the present invention utilizing formulations having this range of fat contained therein.

The product of this invention is particularly useful as a ready-to-eat cereal for packaging in the conventional manner, for mass distribution through normal commercial channels. Ready-to-eat cereal of this invention, packaged in a non-hermetically sealed paper container, in an oil and water barrier, is also a product in accordance with this invention, and provides the outstanding bowl life characteristics, even after distribution through commercial channels.

We claim:

1. In a method for providing a ready-to-eat cereal-derived product, which method comprises the steps of forming a cookie dough, shaping the cookie dough into individual bite size pieces, and baking the resulting shaped pieces to a moisture level of less than 10%, the improvement comprising including in the cookie product an additive member selected from the group consisting of free fatty acid, edible insoluble metallic salt of fatty acids and mixtures thereof, said additive being added in an amount of at least about 0.2% based on the dry weight of cookie ingredients and in an amount sufficient to provide a bowl life of the resulting product of at least 3 minutes; and placing the resulting baked product in an aqueous solution, for serving as a ready-to-eat cereal.

2. The method of claim 1 in which the dough is formed without the inclusion of said additive, and in which subsequently after the product is formed and baked, the additive is added topically, and the resulting coated product is heated sufficiently to melt the additive.

3. The method of claim 1 in which the additive is added in an amount between 0.5 and 5 percent based on the weight of the dry ingredients.

4. The method of claim 1 in which the additive is added in an amount between 0.4 and 1.5 percent based on the weight of the dry ingredients.

5. The method of claim 1 in which the additive is incorporated into the dough, prior to the shaping step.

6. The method of claim 1 in which the additive member is a member selected from the group consisting of stearic acid, magnesium stearate, calcium stearate, and zinc stearate.

7. The method of making ready-to-eat cereals comprising the steps: forming a cookie dough, and including in that dough an additive member selected from the group consisting of free fatty acid, edible insoluble metallic fatty acid salts, and mixtures thereof, said additive being added in an amount of at least about 0.2% based on the dry weight of cookie ingredients; shaping the dough into bite sized pieces: baking the resulting pieces to a moisture level less than 10%; admixing an aqueous solution with the resulting baked pieces for serving as a ready-to-eat cereal 8. The method of claim 7 in which the additive is added in an amount between 0.5 and 5 percent based on the weight of the dry ingredients.

9. The method of claim 7 in which the additive is added in an amount between 0.4 and 1.5 percent based on the weight of the dry ingredients.

10. The method of claim 7 in which the additive is incorporated into the dough, prior to the sheeting and shaping steps.

11. The method of claim 7 in which the additive member is a member selected from the group consisting of stearic acid, magnesium stearate, calcium stearate, and zinc stearate.

12. A ready-to-eat cereal comprising an aqueous solution containing a baked cereal-derived cookie product in bite sized pieces, the improvement of which the bite sized cereal-derived pieces have incorporated therein a additive member selected from the group consisting of free fatty acid, edible insoluble metallic fatty acid salts, and mixtures thereof, said additive being added in an amount of at least 0.2% based on the dry weight of ingredients in the cookie product and in an amount sufficient to provide a bowl life of said pieces of at least 3 minutes.

13. The product of claim 12 wherein said additive is between 0.2 and 5 percent based on the dry ingredients in the cookie pieces.

14. The product of claim 12 wherein said additive is between 0.4 and 1.5 percent by weight based on the weight of the dry ingredients in the cereal-derived pieces.

15. The product of claim 12 wherein said ingredients include from 3 to 17 percent by weight fat, based on the weight of the dry ingredients.

16. The product of claim 12 in which the additive is a member selected from the group consisting of calcium, magnesium, and zinc stearates, and mixtures thereof.

17. The product of claim 12 wherein said additive is magnesium stearate.

18. The method of making ready-to-eat cereals comprising the steps: forming a cookie dough containing from 3 to 17 percent fat by weight inclusive, based on the weight of dry ingredients in the dough, and including in that dough an additive member selected from the group consisting of free fatty acid, edible insoluble metallic fatty acid salts, and mixtures thereof, said additive being added in an amount of at least 0.2% based on the dry weight of cookie ingredients; shaping the dough into bite sized pieces; baking the resulting pieces to a moisture level less than 10%; admixing an aqueous solution with the resulting baked pieces for serving as a ready-to-eat cereal.

19. The method of claim 18 which the additive is added in an amount between 0.5 and 5 percent based on the weight of the dry ingredients.

20. The method of claim 18 in which the additive is added in an amount between 0.4 and 1.5 percent based on the weight of the dry ingredients.

21. The method of claim 18 in which the additive is incorporated into the dough, prior to the sheeting and shaping steps.

22. The method of claim 18 in which the additive member is a member selected from the group consisting of stearic acid, magnesium stearate, calcium stearate, and zinc stearate.

* * * * *